United States Patent
Oh et al.

(10) Patent No.: US 12,097,478 B2
(45) Date of Patent: Sep. 24, 2024

(54) METHOD FOR MANUFACTURING AEROGEL BLANKET

(71) Applicant: LG CHEM, LTD., Seoul (KR)

(72) Inventors: Myung Eun Oh, Daejeon (KR); Mi Ri Kim, Daejeon (KR); Tae Kyeong Kang, Daejeon (KR); Se Won Baek, Daejeon (KR)

(73) Assignee: LG CHEM, LTD., Seoul (KR)

( * ) Notice: Subject to any disclaimer, the term of this patent is extended or adjusted under 35 U.S.C. 154(b) by 162 days.

(21) Appl. No.: 17/425,906

(22) PCT Filed: Sep. 1, 2020

(86) PCT No.: PCT/KR2020/011709
§ 371 (c)(1),
(2) Date: Jul. 26, 2021

(87) PCT Pub. No.: WO2021/045483
PCT Pub. Date: Mar. 11, 2021

(65) Prior Publication Data
US 2022/0204350 A1 Jun. 30, 2022

(30) Foreign Application Priority Data

| Sep. 3, 2019 | (KR) | 10-2019-0109158 |
| Sep. 30, 2019 | (KR) | 10-2019-0121147 |
| Jul. 9, 2020 | (KR) | 10-2020-0084762 |

(51) Int. Cl.
*B01J 13/00* (2006.01)
*B01J 3/00* (2006.01)
(Continued)

(52) U.S. Cl.
CPC ......... *B01J 13/0091* (2013.01); *B01J 3/008* (2013.01); *C01B 33/155* (2013.01);
(Continued)

(58) Field of Classification Search
CPC .... B01J 3/008; C01B 33/155; C01B 33/1585; C01B 33/159; C01B 33/145;
(Continued)

(56) References Cited

U.S. PATENT DOCUMENTS

| 1,131,270 A | 3/1915 | Quick |
| 5,789,075 A | 8/1998 | Frank et al. |

(Continued)

FOREIGN PATENT DOCUMENTS

| CN | 101137587 A | 3/2008 |
| CN | 101698583 A | 4/2010 |

(Continued)

OTHER PUBLICATIONS

Rao et al (Synthesis and Characterization of Hydrophobic TMES/TEOS Based Silica Aerogels, Journal of Porous Materials, 2003) (Year: 2003).*

(Continued)

*Primary Examiner* — Colin W. Slifka
*Assistant Examiner* — Logan Edward Laclair
(74) *Attorney, Agent, or Firm* — Morgan, Lewis & Bockius LLP

(57) ABSTRACT

The present invention relates to a method for manufacturing an aerogel blanket, the method including 1) introducing a catalyzed sol and a substrate for a blanket into a reaction vessel to impregnate the catalyzed sol into the substrate for a blanket, and 2) rotating the substrate for a blanket into which the catalyzed sol is impregnated to perform gelation, wherein the catalyzed sol includes a silica precursor composition, and the silica precursor composition includes a silicate containing a hydrophobic group and a tetraalkyl silicate, wherein a molar ratio of the silicate containing a hydrophobic group and the tetraalkyl silicate is 60:40 to 98:2.

20 Claims, 1 Drawing Sheet

(51) Int. Cl.
*C01B 33/155* (2006.01)
*C01B 33/158* (2006.01)
*C01B 33/159* (2006.01)

(52) U.S. Cl.
CPC ........ *C01B 33/1585* (2013.01); *C01B 33/159* (2013.01); *C01P 2006/32* (2013.01)

(58) Field of Classification Search
CPC ... C01P 2006/32; C04B 14/064; C04B 30/02; C04B 2201/32
See application file for complete search history.

(56) References Cited

U.S. PATENT DOCUMENTS

| | | | |
|---|---|---|---|
| 5,830,387 | A | 11/1998 | Yokogawa et al. |
| 6,068,882 | A | 5/2000 | Ryu |
| 6,364,953 | B1 | 4/2002 | Kawakami et al. |
| 6,799,442 | B1 | 10/2004 | Costa et al. |
| 2001/0034375 | A1 | 10/2001 | Schwertfeger et al. |
| 2005/0046086 | A1 | 3/2005 | Lee et al. |
| 2005/0167891 | A1 | 8/2005 | Lee et al. |
| 2008/0093016 | A1 | 4/2008 | Lee et al. |
| 2009/0123358 | A1 | 5/2009 | Costa et al. |
| 2012/0025127 | A1 | 2/2012 | Yeo et al. |
| 2016/0096949 | A1 | 4/2016 | Evans et al. |
| 2018/0009969 | A1 | 1/2018 | Kim et al. |
| 2018/0029892 | A1 | 2/2018 | Yu et al. |
| 2018/0072578 | A1 | 3/2018 | Kim et al. |
| 2018/0094114 | A1 | 4/2018 | Evans et al. |
| 2018/0112057 | A1 | 4/2018 | Evans et al. |
| 2018/0112058 | A1 | 4/2018 | Evans et al. |
| 2018/0134867 | A1 | 5/2018 | Evans et al. |
| 2018/0147811 | A1 | 5/2018 | Oh et al. |
| 2018/0148888 | A1 | 5/2018 | Kim et al. |
| 2018/0179073 | A1 | 6/2018 | Oh et al. |
| 2018/0179074 | A1 | 6/2018 | Kim et al. |
| 2018/0179075 | A1 | 6/2018 | Kim et al. |
| 2018/0244029 | A1 | 8/2018 | Kim et al. |
| 2018/0264793 | A1 | 9/2018 | Kim et al. |
| 2018/0326700 | A1 | 11/2018 | Kim |
| 2018/0354805 | A1 | 12/2018 | Kim et al. |
| 2019/0002356 | A1 | 1/2019 | Hebalkar |
| 2019/0062167 | A1 | 2/2019 | Kim et al. |
| 2019/0119494 | A1 | 4/2019 | Makino et al. |
| 2019/0203014 | A1 | 7/2019 | Evans et al. |
| 2019/0276322 | A1 | 9/2019 | Kim et al. |
| 2020/0025324 | A1 | 1/2020 | Izumi et al. |
| 2020/0048100 | A1 | 2/2020 | Yu et al. |
| 2020/0215791 | A1 | 7/2020 | Oh et al. |
| 2020/0216322 | A1 | 7/2020 | Min et al. |
| 2020/0224005 | A1 | 7/2020 | Kim et al. |
| 2020/0255295 | A1 | 8/2020 | Kim et al. |
| 2020/0308011 | A1 | 10/2020 | Kim et al. |
| 2021/0114887 | A1 | 4/2021 | Oh et al. |
| 2021/0155486 | A1 | 5/2021 | Kang et al. |
| 2021/0198112 | A1 | 7/2021 | Oh et al. |
| 2022/0048778 | A1 | 2/2022 | Kim et al. |

FOREIGN PATENT DOCUMENTS

| | | | |
|---|---|---|---|
| CN | 103910516 | A | 7/2014 |
| CN | 104164758 | A | 11/2014 |
| CN | 105597635 | A | 5/2016 |
| CN | 105664809 | A | 6/2016 |
| CN | 106630930 | A | 5/2017 |
| CN | 106794996 | A | 5/2017 |
| CN | 107034678 | A | 8/2017 |
| CN | 107129262 | A | 9/2017 |
| CN | 107406327 | A | 11/2017 |
| CN | 107523275 | A | 12/2017 |
| CN | 107531495 | A | 1/2018 |
| CN | 107709013 | A | 2/2018 |
| CN | 107735362 | A | 2/2018 |
| CN | 107735385 | A | 2/2018 |
| CN | 107848815 | A | 3/2018 |
| CN | 207310663 | U | 5/2018 |
| CN | 108136749 | A | 6/2018 |
| CN | 108383129 | A | 8/2018 |
| CN | 108585762 | A | 9/2018 |
| CN | 108658572 | A | 10/2018 |
| CN | 108689678 | A | 10/2018 |
| CN | 108821741 | A | 11/2018 |
| CN | 109415214 | A | 3/2019 |
| CN | 109437832 | A | 3/2019 |
| CN | 109868598 | A | 6/2019 |
| CN | 110615663 | A | 12/2019 |
| CN | 111925186 | A | 11/2020 |
| EP | 3 284 720 | A1 | 2/2018 |
| EP | 3 375 757 | A1 | 9/2018 |
| EP | 3453676 | A1 | 3/2019 |
| EP | 2569304 | A1 | 11/2019 |
| EP | 3569304 | A1 | 11/2019 |
| EP | 3 778 483 | A1 | 2/2021 |
| EP | 3 878 812 | A1 | 9/2021 |
| EP | 3 901 094 | A1 | 10/2021 |
| JP | 2001-007100 | A | 1/2001 |
| JP | 2001-072408 | A | 3/2001 |
| JP | 2003-513873 | A | 4/2003 |
| JP | 4115088 | B2 | 7/2008 |
| JP | 2008-532898 | A | 8/2008 |
| JP | 2011-190136 | A | 9/2011 |
| JP | 2012-144428 | A | 8/2012 |
| JP | 2014-173222 | A | 9/2014 |
| JP | WO2017/010551 | A1 | 1/2017 |
| JP | 2017-533163 | A | 11/2017 |
| JP | 2018-523022 | A | 8/2018 |
| JP | 2018-532682 | A | 11/2018 |
| JP | 2018-535178 | A | 11/2018 |
| JP | 2018-204725 | A | 12/2018 |
| JP | 2018-537311 | A | 12/2018 |
| JP | 2018-537383 | A | 12/2018 |
| JP | 2018-538224 | A | 12/2018 |
| JP | 2021-523869 | A | 9/2021 |
| KR | 10-2001-0104372 | A | 11/2001 |
| KR | 10-0372823 | B1 | 2/2003 |
| KR | 10-0385829 | B1 | 10/2003 |
| KR | 10-0710887 | B1 | 4/2007 |
| KR | 10-2007-0114668 | A | 12/2007 |
| KR | 10-0831877 | B1 | 5/2008 |
| KR | 10-2010-0053350 | A | 5/2010 |
| KR | 10-2010-0133268 | A | 12/2010 |
| KR | 10-2011-0067163 | A | 6/2011 |
| KR | 10-2011-0082379 | A | 7/2011 |
| KR | 10-2011-0126381 | A | 11/2011 |
| KR | 10-2012-0012836 | A | 2/2012 |
| KR | 10-1147494 | B1 | 5/2012 |
| KR | 10-2012-0070948 | A | 7/2012 |
| KR | 10-1176137 | B1 | 8/2012 |
| KR | 10-2014-0120721 | A | 10/2014 |
| KR | 10-1498562 | B1 | 3/2015 |
| KR | 20170098592 | | * 2/2016 |
| KR | 10-2016-0101330 | A | 8/2016 |
| KR | 2017-0031011 | A | 3/2017 |
| KR | 10-2017-0063800 | A | 6/2017 |
| KR | 10-2017-0086831 | A | 7/2017 |
| KR | 10-2017-0096513 | A | 8/2017 |
| KR | 10-2017-0096514 | A | 8/2017 |
| KR | 10-2017-0098003 | A | 8/2017 |
| KR | 10-2017-0098592 | A | 8/2017 |
| KR | 10-2017-0112985 | A | 10/2017 |
| KR | 10-2018-0029235 | A | 3/2018 |
| KR | 10-2018-0033064 | A | 4/2018 |
| KR | 2018-0132723 | A | 12/2018 |
| KR | 10-2019-008007 | A | 1/2019 |
| KR | 10-1953349 | B1 | 2/2019 |
| KR | 20190021956 | A | 3/2019 |
| KR | 10-1953347 | B1 | 5/2019 |
| KR | 10-2019-0063799 | A | 6/2019 |
| KR | 10-2019-0065325 | A | 6/2019 |
| KR | 10-2019-0078765 | A | 7/2019 |
| KR | 10-2019-0098728 | A | 8/2019 |
| KR | 10-2023531 | B1 | 9/2019 |
| KR | 10-2020-0063084 | A | 6/2020 |

(56) References Cited

FOREIGN PATENT DOCUMENTS

| WO | 2016/054524 A2 | 4/2016 |
| WO | WO-2017145359 A1 * | 8/2017 |
| WO | 2017/171217 A1 | 10/2017 |
| WO | 2018/208005 A1 | 11/2018 |
| WO | 2019/039841 A1 | 2/2019 |
| WO | 2019/098519 A1 | 5/2019 |
| WO | 2019/107706 A1 | 6/2019 |
| WO | 2021/045483 A1 | 3/2021 |

OTHER PUBLICATIONS

Iswar et al (Effect of aging on silica aerogel properties, Microporous and Mesoporous Materials, 2016) (Year: 2016).*
Machine translation of KR 20170098592 (Year: 2016).*
Extended European Search Report issued in corresponding European Patent Application No. 20860200.3 dated Sep. 27, 2022.
Extended European Search Report issued in corresponding European Patent Application No. 20859770.8 dated Sep. 30, 2022.
Ma et al., "Preparation and Low-temperature Properties of Fiber Reinforced SiO2 Aerogel Composites," Materials Review, 2015, vol. 29, No. 10, pp. 43-46 (see English abstract).
Zhang et al., "Hygrothermal performance of silica aerogel composite for thermal insulation material," New Building Materials, 2017, No. 3, pp. 67-71 (see English abstract).
Extended European search report issued in corresponding European Patent Application No. 20861673.0 dated Dec. 1, 2021.
Extended European search report issued in corresponding European Patent Application No. 20860326.6 dated Jan. 4, 2022.
Extended European search report issued in corresponding European Patent Application No. 20860342.3 dated Jan. 21, 2022.
Aspen Aerogel, AR5100, Vibration Testing Report, Feb. 4, 2003.
International Search Report (with partial translation) and Written Opinion dated Dec. 17, 2020, issued in corresponding International Patent Application No. PCT/KR2020/011709.
Office Action issued in the corresponding U.S. Appl. No. 17/621,830, dated May 23, 2023.
Yokogawa et al., "Hydrophobic silica aerogels," 1995, Journal of Non-Crystalline Solids, vol. 186, p. 23-29.
Final Office Action issued Nov. 2, 2023 for counterpart U.S. Appl. No. 17/429,116.
Non-Final Office Action issued Oct. 19, 2023 for counterpart U.S. Appl. No. 17/416,619.
Lee, et al. "Super-insulating, flame-retardant, and flexible poly(dimethylsiloxane) composites based on silica aerogel," Composites Part A: Applied Science and Manufacturing, vol. 123, p. 108-113, 2019 https://doi.org/10.1016/j.compositesa.2019.05.004.
Non-Final Office Action issued on Feb. 20, 2024 for U.S. Appl. No. 17/429,116.

* cited by examiner

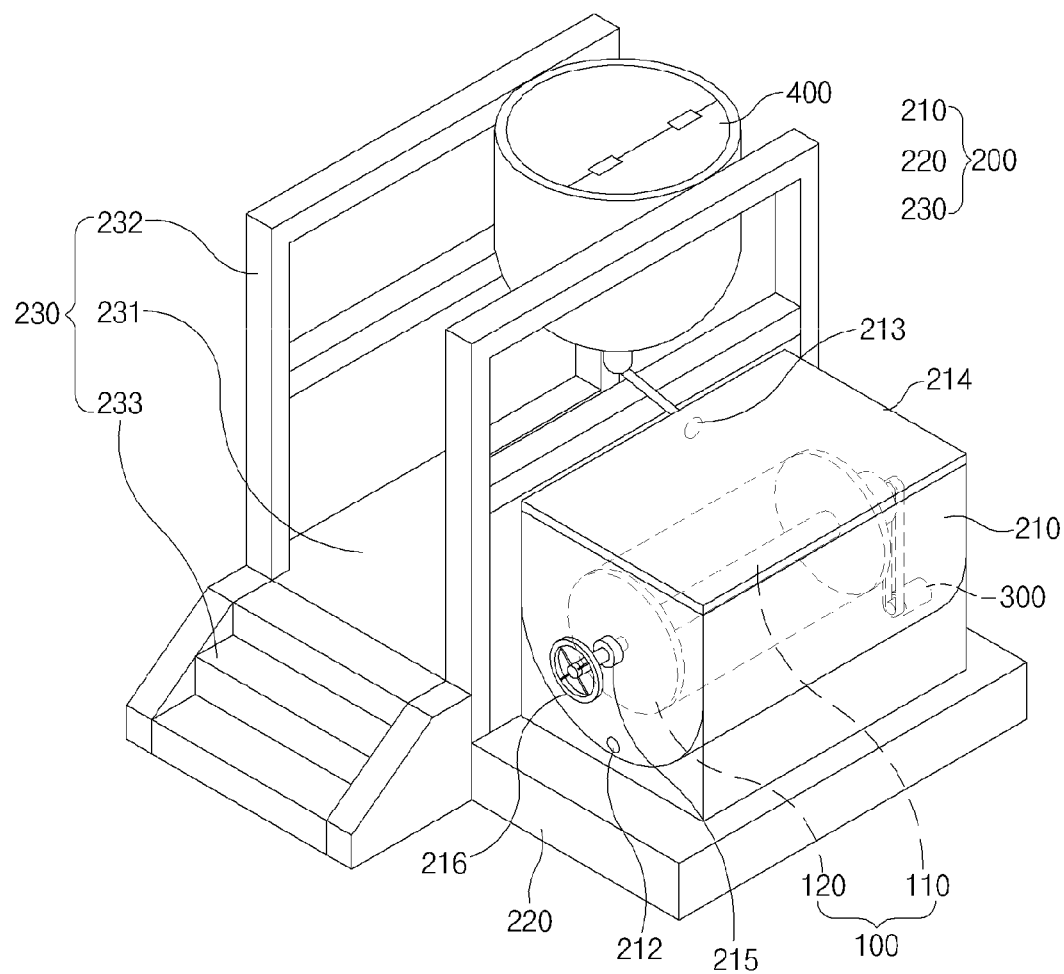

METHOD FOR MANUFACTURING AEROGEL BLANKET

TECHNICAL FIELD

Cross-Reference to Related Applications

This application claims the benefit of Korean Patent Application Nos. 10-2019-0109158, filed on Sep. 3, 2019, 10-2019-0121147, filed on Sep. 30, 2019, and 10-2020-0084762, filed on Jul. 9, 2020, in the Korean Intellectual Property Office, of which are incorporated herein by reference in their entirety.

Technical Field

The present invention relates to a method for manufacturing an aerogel blanket, the method capable of securing the hydrophobicity of a manufactured aerogel blanket without having to perform a surface modification step which requires the excessive use of an expensive surface modifier, and furthermore, capable of atmospheric drying.

Background Art

An aerogel is a super-porous, high specific surface area (≥500 $m^2$/g) material having a porosity of about 90-99.9% and a pore size in the range of 1-100 nm, and is a material having excellent properties of ultra-light weight, super thermal insulation, ultra-low dielectric, and the like. Accordingly, research on the development of aerogel materials as well as research on the practical use thereof as transparent insulation materials, environmentally friendly high temperature insulation materials, ultra-low dielectric thin films for highly integrated devices, catalysts and catalyst carriers, electrodes for super capacitors, and electrode materials for seawater desalination have been actively conducted.

The biggest advantages of the aerogel are that the aerogel has super-insulation properties exhibiting a thermal conductivity of 0.300 W/m·K or less, which is lower than that of a conventional organic thermal insulation material such as Styrofoam, and that fire vulnerability and the generation of harmful gases in case of occurrence of fire which are fatal weaknesses of the organic thermal insulation material can be solved.

In general, the aerogel is produced by preparing a hydrogel from a silica precursor such as water glass and an alkoxysilane group (TEOS, TMOS, MTMS, and the like) and removing a liquid component inside the hydrogel without destroying a microstructure.

Particularly, a hydrophobic silica aerogel blanket in which a hydrophobic silica aerogel is formed in a fiber is a functional thermal insulation material which prevents corrosion by moisture, and is widely used in construction or industrial fields. In general, such a hydrophobic silica aerogel blanket is manufactured through steps of silica sol solution preparation, gelation, aging, surface modification, and drying.

However, the surface modification step of the typical manufacturing method as described above uses a large amount of an organic solvent and an expensive surface modifier, and the process thereof is complex and long, so that economic feasibility and productivity are not good. In addition, ammonia generated when the surface of the silica aerogel is modified by the surface modifier reacts with carbon dioxide used in a supercritical drying step and forms ammonium carbonate salt, thereby causing problems such as blocking the piping of supercritical drying equipment, and the like, resulting in inhibiting processing efficiency. In addition, since there is a large amount of ammonia remaining in waste liquid generated after drying, it is impossible to recycle the waste liquid immediately, and there are problems in that a long purification process is required and purification cost increases in order to recycle the waste liquid.

In addition, the drying step of the typical manufacturing method as described above is performed by supercritical drying, which is an expensive process, and since the supercritical drying is performed under a high-pressure condition, it is not easy to secure safety. Also, only batch production is possible, which may cause a decrease in productivity. Therefore, in order to replace supercritical drying, an atmospheric drying method has been proposed. However, since a surface modification reaction by the surface modification step starts from the outermost part of an aerogel, there is a problem in that it is difficult for a sufficient amount of surface modifier to be introduced into the aerogel. Therefore, if the atmospheric drying method is used, the adsorption of moisture occurs by the hydrogen bonding between a hydroxyl group present on the surface of the inside of the aerogel and moisture in a solvent, so that there is a problem in that it is difficult to secure the same physical properties when the supercritical drying method is used.

Meanwhile, the aerogel blanket may be manufactured by gel casting or by preparing aerogel powder or granules and then depositing the same on a substrate for a blanket using a binder. Currently, a gel casting method using a roll-to-roll technique is known as a commercially available technology. However, in order to manufacture an aerogel blanket by the roll-to-roll technique, a conveyor belt must be included in the equipment to cast a catalyzed sol and the like on a substrate and to ensure complete gelation, and the conveyor belt must be extended until the gelation is completed, so that there is a problem in that the equipment scale becomes massive in a mass production stage. In addition, there is a problem in that as an aerogel blanket to be manufactured becomes longer, so does a conveyor belt, and therefore, gelation time is increased, thereby increasing an overall manufacturing time. In particular, when an aerogel blanket becomes thinner, the length thereof is increased, thereby increasing manufacturing time, so that there is a problem in that the manufacturing time is affected by the thickness and length of the blanket.

(Patent Document 1) KR10-2012-0070948A

DISCLOSURE OF THE INVENTION

Technical Problem

An aspect of the present invention provides a method for manufacturing an aerogel blanket, the method capable of omitting a surface modification step which uses a large amount of an organic solvent and an expensive surface modifier, and the process of which is complex and long, thereby inhibiting economic feasibility and productivity, when manufacturing an aerogel blanket.

Another aspect of the present invention provides a method for manufacturing an aerogel blanket, wherein a surface modification step is omitted, so that energy consumption may be reduced, and due to the omission of the step, surface modification equipment is not required, so that a simplified manufacturing facility may be used.

Yet another aspect of the present invention provides a method for manufacturing an aerogel blanket, wherein drying may be performed by supercritical drying as well as atmospheric drying, when manufacturing an aerogel blanket.

Still another aspect of the present invention provides a method for manufacturing an aerogel blanket, the method capable of greatly reducing manufacturing time by performing gelation while rotating a substrate for a blanket into which a catalyzed sol is impregnated during a gelation process and simplifying manufacturing equipment by not allowing the thickness and length of the aerogel blanket to affect the manufacturing time, when manufacturing an aerogel blanket by a gel casting method.

Still yet another aspect of the present invention provides a method for manufacturing an aerogel blanket, the method capable of allowing an aerogel to be uniformly formed in a substrate for a blanket by rotating the substrate for a blanket into which a sol is impregnated, thereby further improving the uniformity of the aerogel formed in the substrate for a blanket, and accordingly exhibiting uniform thermal conductivity in the entire aerogel blanket, and improving the thermal conductivity of the aerogel blanket.

Technical Solution

According to an aspect of the present invention, there is provided a method for manufacturing an aerogel blanket, the method including 1) introducing a catalyzed sol and a substrate for a blanket into a reaction vessel to impregnate the catalyzed sol into the substrate for a blanket, and 2) rotating the substrate for a blanket into which the catalyzed sol is impregnated to perform gelation, wherein the catalyzed sol includes a silica precursor composition, and the silica precursor composition includes a silicate containing a hydrophobic group and a tetraalkyl silicate, wherein a molar ratio of the silicate containing a hydrophobic group and the tetraalkyl silicate is 60:40 to 98:2.

Advantageous Effects

When a method for manufacturing an aerogel blanket according to the present invention is used, it is possible to omit a surface modification step which uses a large amount of an organic solvent and an expensive surface modifier, and the process of which is complex and long, thereby inhibiting economic feasibility and productivity. Accordingly, energy consumption may be reduced, and due to the omission of the step, surface modification equipment is not required, so that a simplified manufacturing facility may be used.

In addition, when the method for manufacturing an aerogel blanket according to the present invention is used, drying may be performed by supercritical drying as well as atmospheric drying.

In addition, when the method for manufacturing an aerogel blanket according to the present invention is used, it is possible to greatly reduce manufacturing time by performing gelation by rotating a substrate for a blanket into which a catalyzed sol is impregnated, and also simplify manufacturing equipment by not allowing the thickness and length of an aerogel blanket to affect the manufacturing time. Particularly, when the substrate for a blanket is thin and long, the above-described effect of the present invention is further maximized, in which case it is particularly advantageous in greatly increasing productivity.

In addition, when the method for manufacturing an aerogel blanket according to the present invention is used, since the substrate for a blanket into which the catalyzed sol is impregnated is rotated, an aerogel may be uniformly formed in the substrate for a blanket to further improve the uniformity of the aerogel formed in the substrate for a blanket.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

FIG. 1 is a perspective view showing an aerogel blanket manufacturing device according to an embodiment of the present invention.

MODE FOR CARRYING OUT THE INVENTION

Hereinafter, the present invention will be described in more detail to facilitate understanding of the present invention.

It will be understood that words or terms used in the description and claims of the present invention shall not be construed as being limited to having the meaning defined in commonly used dictionaries. It will be further understood that the words or terms should be interpreted as having meanings that are consistent with their meanings in the context of the relevant art and the technical idea of the invention, based on the principle that an inventor may properly define the meaning of the words or terms to best explain the invention.

The present invention provides a method for manufacturing an aerogel blanket.

The method for manufacturing an aerogel blanket includes 1) introducing a catalyzed sol and a substrate for a blanket into a reaction vessel to impregnate the catalyzed sol into the substrate for a blanket, and 2) rotating the substrate for a blanket into which the catalyzed sol is impregnated to perform gelation, wherein the catalyzed sol includes a silica precursor composition, and the silica precursor composition includes a silicate containing a hydrophobic group and a tetraalkyl silicate, wherein a molar ratio of the silicate containing a hydrophobic group and the tetraalkyl silicate is 60:40 to 98:2.

Hereinafter, each step of the method for manufacturing an aerogel blanket of the present invention will be described in detail.

Step 1) according to an embodiment of the present invention is a step of preparation for forming an aerogel blanket, which is to impregnate a catalyzed sol into a substrate for a blanket, wherein a catalyzed sol may be prepared and then the prepared catalyzed sol and a substrate for a blanket may be introduced into a reaction vessel to impregnate the catalyzed sol into the substrate for a blanket.

The term "impregnation" used in the present invention may be achieved by introducing a catalyzed sol having fluidity to a substrate for a blanket, and may indicate that the catalyzed sol is penetrated into pores inside the substrate for a blanket.

In addition, in Step 1) according to an embodiment of the present invention, as long as a substrate for a blanket and a catalyzed sol are introduced in a reaction vessel, the introduction order thereof is not particularly limited. Specifically, in Step 1), the introduction may be performed by any one method among a method for introducing a substrate for a blanket into a reaction vessel and then introducing a catalyzed sol, a method for introducing a catalyzed sol into a reaction vessel and then introducing a substrate for a blanket, and a method for introducing a substrate for a blanket while introducing a catalyzed sol into a reaction vessel. Among the above, in terms of achieving more uniform impregnation, the method for introducing a substrate for a blanket and then introducing a catalyzed sol may be more desirable. Specifically, when a substrate for a blanket is first introduced, the substrate for a blanket may be rotated when a catalyzed sol is introduced, so that more uniform impregnation may be induced.

According to an embodiment of the present invention, in Step 1), the impregnation may be performed while rotating the substrate for a blanket as described above. When impregnation is performed while rotating a substrate for a blanket, a catalyzed sol may uniformly come into contact with all surfaces of the substrate for a blanket to induce uniform impregnation, which is more desirable.

In the present invention, the catalyzed sol may be prepared by mixing a sol and a base catalyst, wherein the base catalyst serves to promote gelation in Step 2) by increasing the pH of the sol.

At this time, the sol is not limited as long as it is a material capable of forming a porous gel by a sol-gel reaction, and specifically, may include an inorganic sol, an organic sol, or a combination thereof. The inorganic sol may include zirconia, yttrium oxide, hafnia, alumina, titania, ceria, silica, magnesium oxide, calcium oxide, fluorinated magnesium, fluorinated calcium, and combinations thereof, and the organic sol may be polyacrylate, polyolefin, polystyrene, polyacrylonitrile, polyurethane, polyimide, polyfurfural alcohol, phenol furfuryl alcohol, melamine formaldehyde, resorcinol formaldehyde, cresol formaldehyde, phenol formaldehyde, polyvinyl alcohol dialdehyde, polycyanurate, polyacrylamide, various epoxies, agar, agarose, and combinations thereof. In addition, in terms of securing excellent miscibility with a substrate for a blanket, further improving porosity when being formed as a gel, and manufacturing an aerogel blanket having low thermal conductivity, the sol may be preferably a silica sol.

The sol according to an embodiment of the present invention contains a sol precursor, water, and an organic solvent, and may be prepared by mixing a sol precursor, water, and an organic solvent. When the catalyzed sol according to an embodiment of the present invention is a catalyzed silica sol, in Step 1), the catalyzed silica sol may be prepared by mixing a silica sol and a base catalyst, wherein the silica sol may be prepared by mixing a silica precursor composition, water, and an organic solvent. In addition, the silica sol may undergo hydrolysis at a low pH to facilitate gelation, and at this time, an acid catalyst may be used to lower a pH.

A silica precursor composition which may be used for preparing the silica sol may include an alkoxide-based compound containing silicon, and specifically, may include a silicate containing a hydrophobic group and a tetraalkyl silicate.

According to an embodiment of the present invention, the silicate containing a hydrophobic group is to impart hydrophobicity to an aerogel without a surface modification step when preparing the aerogel, and may be one or more selected from the group consisting of methyltriethoxysilane (MTES), trimethylethoxysilane (TMES), trimethylsilanol (TMS), methyltrimethoxysilane (MTMS), dimethyldiethoxysilane (DMDEOS), ethyltriethoxysilane (ETES), and phenyltriethoxysilane (PTES). When a silicate containing a hydrophobic group is included in a silica precursor composition as described above, it is possible to omit a surface modification step, and accordingly, a regeneration process is not required when recycling a solvent. Also, since the hydrophobic group may be evenly introduced from the inside to the outside of the aerogel, hydrophobicity is maximized, and accordingly, water with high surface tension may be easily pushed out, so that it is possible to perform atmospheric drying in the following drying step.

According to an embodiment of the present invention, the tetraalkyl silicate is to reinforce the strength of an aerogel and to ensure thermal insulation performance, and may be a tetraalkyl silicate such as tetramethyl orthosilicate (TMOS), tetraethyl orthosilicate (TEOS), tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, and tetradodecyl orthosilicate. Among the above, the silica precursor according to an embodiment of the present invention may more specifically be tetraethyl orthosilicate (TEOS).

According to an embodiment of the present invention, the molar ratio of the silicate containing a hydrophobic group and the tetraalkyl silicate in the silica precursor composition may be 60:40 to 98:2. When in the above range, the strength and thermal insulation performance of an aerogel may be maximized when supercritical drying is performed. In addition, when atmospheric drying is performed, the molar ratio of the silicate containing a hydrophobic group and the tetraalkyl silicate in the silica precursor composition may be 85:15 to 98:2, or 90:10 to 98:2. When in the above range, the strength and thermal insulation performance of an aerogel may be secured with high efficiency, and also, a decrease in thermal insulation performance may be prevented by preventing shrinkage during the atmospheric drying.

The silica precursor composition may be used in an amount which allows the content of silica ($SiO_2$) contained in the silica sol to be 3 wt % to 30 wt %, 5 wt % to 20 wt %, or 6 wt % to 12 wt %. When in the above range, a sufficient content of a silica aerogel may be secured in a blanket to be finally manufactured, so that a thermal insulation effect of a desired level may be expected. In addition, excessive formation of a silica aerogel is prevented, so that the degradation in the mechanical properties of the blanket, the flexibility thereof in particular, may be prevented.

In addition, as an organic solvent which may be used for preparing the sol of the present invention, any material may be used without limitation as long as it has compatibility with a sol precursor and water. Specifically, a polar organic solvent may be used, and more specifically, an alcohol may be used. Here, the alcohol may specifically be a monohydric alcohol such as methanol, ethanol, isopropanol, and butanol; or a polyhydric alcohol such as glycerol, ethylene glycol, propylene glycol, diethylene glycol, dipropylene glycol, and sorbitol, and any one thereof or a mixture of two or more thereof may be used. When considering the miscibility with water and an aerogel to be manufactured, the alcohol may be a monohydric alcohol having 1 to 6 carbon atoms such as methanol, ethanol, isopropanol, and butanol. The organic solvent as described above may be used in an appropriate amount in consideration of the content of an aerogel to be finally prepared.

The silica sol according to an embodiment of the present invention may include a silica precursor composition and water in a molar ratio of 1:10 to 1:1. In addition, a silica precursor composition and an organic solvent may be included in a weight ratio of 1:2 to 1:9, and preferably, may be included in a weight ratio of 1:2 to 1:6. When a silica precursor composition satisfies the above molar ratio or weight ratio with water and an organic solvent, the production yield of aerogel may further increase, so that there is an effect of improving thermal insulation performance.

In addition, as the acid catalyst which may be further included in the sol according to an embodiment of the present invention, any acid catalyst which may allow a pH to be 3 or less may be used without limitation. As an example, hydrochloric acid, nitric acid, or sulfuric acid may be used. At this time, the acid catalyst may be added in an amount which allows the pH of the sol to be 3 or less, and may be added in the form of an aqueous solution dissolved in an aqueous solvent.

Also, a base catalyst which may be used in the catalyzed sol according to an embodiment of the present invention may be an inorganic base such as sodium hydroxide and potassium hydroxide, or an organic base such as ammonium hydroxide. Specifically, the base catalyst may be one or more selected from the group consisting of sodium hydroxide (NaOH), potassium hydroxide (KOH), calcium hydroxide ($Ca(OH)_2$), ammonia ($NH_3$), ammonium hydroxide ($NH_4OH$; ammonia water), tetramethylammonium hydroxide (TMAH), tetraethylammonium hydroxide (TEAH), tetrapropylammonium hydroxide (TPAH), tetrabutylammonium hydroxide (TBAH), methylamine, ethylamine, isopropylamine, monoisopropylamine, diethylamine, diisopropylamine, dibutylamine, trimethylamine, triethylamine, triisopropylamine, tributylamine, choline, monoethanolamine, diethanolamine, 2-aminoethanol, 2-(ethyl amino) ethanol, 2-(methyl amino) ethanol, N-methyl diethanolamine, dimethylaminoethanol, diethylaminoethanol, nitrilotriethanol, 2-(2-aminoethoxy) ethanol, 1-amino-2-propanol, triethanolamine, monopropanolamine, dibutanolamine, and pyridine, preferably sodium hydroxide, ammonia, ammonium hydroxide or a mixture thereof.

The base catalyst may be included in an amount which allows the pH of the sol to be 7 to 11. If the pH of the sol is out of the above range, the gelation in Step 2) may not be easily achieved, or a gelation rate may be too low, so that processability may be degraded. In addition, since the base may be precipitated when introduced in a solid phase, it may be preferable that the base is added in the form of a solution diluted by an aqueous solvent or the above-described organic solvent. At this time, the dilution ratio of the base catalyst and the organic solvent, specifically an alcohol, may be 1:4 to 1:100 based on volume.

According to an embodiment of the present invention, the catalyzed sol may further be added with an additive if necessary. At this time, as the additive, all known additives which may be added when manufacturing an aerogel may be applied, and for example, an additive such as an opacifying agent, flame retardant, and the like may be used.

The substrate for a blanket may be introduced in an appropriate form which facilitates the introduction according to the shape of a reaction vessel. Specifically, a substrate for a blanket wound on a bobbin in the form of a roll may be introduced into the reaction vessel to facilitate the rotation in Step 2) to be described later. At this time, the bobbin can be a shaft capable of rotating the substrate for a blanket, and anything may be applied without limitation as long as it can wind the substrate for a blanket. As an example, a polygonal cylindrical column, preferably a cylindrical column having a size which may fit inside the reaction vessel may be used. In addition, according to an embodiment of the present invention, the bobbin may include a winding rod capable of winding the substrate for a blanket in the form of a roll, and a support plate which supports a side portion of the substrate for a blanket such that the substrate for a blanket wound on the winding rod is not displaced at the time of rotation. At this time, it is preferable that the winding rod has a number of hollows such that the catalyzed sol may be easily impregnated on the inside of the substrate for a blanket. Meanwhile, in order to allow the catalyzed sol to be introduced into the side portion of the substrate for a blanket, a mesh-type support plate may be used, or the support plate may include a number of hollows. Any material having sufficient strength to support the blanket may be used as the material of the bobbin. Specifically, stainless steel, PE, PP, and Teflon may be used.

The substrate for a blanket may be wound on the bobbin, and the bobbin may be placed into a reaction vessel and fixed. Here, the bobbin may be fixed at any position of the reaction vessel. However, in terms of introducing the substrate for a blanket in a large amount into the reaction vessel of a predetermined volume, thereby increasing production efficiency, the bobbin may preferably be fixed at a central portion of the reaction vessel. In addition, the bobbin may be positioned such that the long axis of the bobbin and the long axis of the reaction vessel are parallel to each other.

Also, the substrate for a blanket according to an embodiment of the present invention may specifically be a porous substrate in terms of improving the thermal insulation properties of an aerogel blanket. When a porous substrate for a blanket is used, a catalyzed sol is allowed to easily penetrate into the substrate, and thus, forms an aerogel uniformly inside the substrate for a blanket, so that an aerogel blanket manufactured may have excellent thermal insulation properties.

The substrate for a blanket which may be used according to an embodiment of the present invention may be a film, a sheet, a net, a fiber, a foam, a non-woven body, or a laminate of two or more layers thereof. Also, according to the use of the substrate for a blanket, surface roughness may be formed or patterned on the surface thereof. More specifically, the substrate for a blanket may be a fiber capable of further improving thermal insulation performance by including a space or a void through which an aerogel may be easily inserted into the substrate for a blanket. Furthermore, the substrate for a blanket may preferably have low thermal conductivity.

Specifically, the substrate for a blanket may be polyamide, polybenzimidazole, polyaramid, an acryl resin, a phenol resin, polyester, polyetheretherketone (PEEK), polyolefin (e.g., polyethylene, polypropylene, a copolymer thereof, or the like), cellulose, carbon, cotton, wool, hemp, a non-woven fabric, a glass fiber, ceramic wool, or the like. More specifically, the substrate for a blanket in the present invention may be a glass fiber.

According to an embodiment of the present invention, the reaction vessel may be a reaction vessel for performing gelation, and a vessel in any shape such a polygon or a cylinder may be used as long as it is a vessel providing a space in which a substrate for a blanket into which a catalyzed sol is impregnated may rotate therein. However, a cylindrical reaction vessel may be preferably used in terms of facilitating the introduction of a substrate for a blanket wound in the form of a roll and the rotation of the substrate for a blanket into which a catalyzed sol is impregnated during a gelation reaction.

In Step 1) above, when the catalyzed sol is introduced, in order to improve the bonding of the substrate for a blanket and the catalyzed sol, the substrate for a blanket may be lightly pressed down to achieve sufficient impregnation. Thereafter, the substrate for a blanket may be pressed at a constant pressure to a predetermined thickness to remove excess sol, thereby shortening drying time. In another embodiment, when a catalyzed sol is introduced into a reaction vessel, and a substrate for a blanket is sufficiently impregnated so that the liquid level in the reaction vessel no longer changes, a drain valve connected to the reaction vessel may be opened to recover remaining sol.

In addition, the catalyzed sol and the substrate for a blanket may each be introduced in an amount, specifically in an amount of 1 to 100% of the internal volume of the reaction vessel, and in terms of shortening the gelation time in Step 3) and uniformly forming an aerogel inside the substrate for a blanket, may be introduced in an amount of 1 to 60% of the volume of the reaction vessel, more specifically 10 to 60%, even more preferably 30 to 60%, respectively.

According to an embodiment of the present invention, the catalyzed sol may be introduced in an amount of 80 to 120%, preferably 90 to 110%, based on the volume of the substrate for a blanket. In addition, preferably, the introduction amount of the substrate for a blanket and the catalyzed sol may satisfy the above introduction ratio therebetween under the conditions satisfying the introduction amount with respect to the reaction vessel. When a catalyzed sol satisfies the introduction ratio (introduction amount) with respect to the volume of a substrate for a blanket, the catalyzed sol is more uniformly impregnated on the substrate for a blanket, so that an aerogel blanket to be manufactured may have more uniform physical properties, and since the catalyzed sol may all be impregnated on the substrate for a blanket, it is possible to prevent the loss of raw materials and prevent a problem in which the catalyzed sol is gelled alone.

Step 2) according to an embodiment of the present invention is to manufacture a wet gel blanket composite (wet gel blanket), and may be performed by rotating a substrate for a blanket into which a catalyzed sol is impregnated to be gelled.

The rotation of the substrate for a blanket into which a catalyzed sol is impregnated may be performed by any method or device as long as the method or device allows rotation during gelation in a reaction vessel. Specifically, when a substrate for a blanket is introduced and fixed while being wound on a bobbin in Step 1) above, the substrate for a blanket into which a catalyzed sol is impregnated is present in the reaction vessel while being wound on the bobbin, so that the substrate for a blanket into which a catalyzed sol is impregnated may be rotated by rotating the bobbin.

In the present invention, the gelation may be to form a network structure from a catalyzed sol, wherein the network structure may represent a planar mesh structure in which specific polygons having one or more types of atomic arrangement are linked to each other, or a structure in which specific polyhedrons share their vertices, edges, faces, and the like with each other to form a three-dimensional skeleton structure.

According to an embodiment of the present invention, a gelation reaction may be performed after sealing a reaction vessel to which a catalyzed sol and a substrate for a blanket are introduced. In addition, according to an embodiment of the present invention, rotation may be performed by disposing a long axis in a lateral direction, that is, in a horizontal direction. If the reaction vessel (main body) is a cylindrical reaction vessel, the cylindrical reaction vessel may be laid down and rotated. That is, the rotating axis of the reaction vessel of the present invention may be horizontal, but is not limited thereto.

According to an embodiment of the present invention, the type of a device for manufacturing an aerogel blanket is not limited as long as it is a device including the reaction vessel (main body) and capable of rotating the substrate for a blanket into which a catalyzed sol is impregnated present in the reaction vessel. Any device known in the art may be used as long as the device is capable of rotating. Specifically, any known device may be used as long as it is capable of fixing the position of a bobbin in a reaction vessel and rotating the bobbin whose position is fixed. An example of a device for manufacturing an aerogel blanket which may be applied in the present invention will be described later.

In addition, according to an embodiment of the present invention, after Step 1) above is completed, Step 2) above may be initiated to sequentially perform Step 1) above and Step 2) above.

According to another embodiment of the present invention, before Step 1) above is completed, Step 2) above may be initiated. When Step 2) is performed before the completion of Step 1) above as described above, all of the catalyzed sol may be introduced into the reaction vessel until gelation is completed, specifically before the completion of the gelation.

According to an embodiment of the present invention, the rotation rate in Step 2) above may be applied without limitation as long as it is a rotation rate which allows an aerogel to uniformly form in a blanket. As an example, gelation may be performed while performing rotation at a rotation rate of 1 rpm to 300 rpm, preferably 5 rpm to 150 rpm, 5 rpm to 100 rpm, and more preferably 10 rpm to 30 rpm. When the reaction vessel satisfies the rotation rate in the above range, a sol may be evenly impregnated on a substrate for a blanket, so that an aerogel is more uniformly formed during gelation. Accordingly, it is possible to secure very uniform thermal conductivity throughout an aerogel blanket and there is an advantage in that the safety of a process for manufacturing the aerogel blanket is increased by increasing the stability of a reaction vessel and an apparatus for rotating the reaction vessel.

In the present invention, a catalyzed sol and a substrate for a blanket are all put into a reaction vessel to be gelled, thereby manufacturing an aerogel blanket, so that unlike a roll-to-roll method, which has been typically applied, a moving element such as a conveyor belt is not separately required, and thus there is an advantage in that a space to be used during the manufacturing may be greatly reduced. In addition, as in the roll-to-roll method, when a substrate for a blanket is disposed on a moving element and then a catalyzed sol is applied on the substrate for a blanket, followed by continuously moving the moving element to perform gelation, the gelation is not simultaneously performed on the entire substrate for a blanket, but is sequentially performed over time while continuously supplying the substrate for a blanket and the catalyzed sol, so that there is a problem in that even if a substrate for a blanket having the same thickness and length is used, gelation takes much longer than the gelation process according to an embodiment of the present invention. Specifically, the longer the substrate for a blanket, the more noticeable the problem that gelation process time becomes longer in order to achieve sufficient gelation on the entire substrate for a blanket. However, according to an embodiment of the present invention, the gelation of a sol is simultaneously achieved on the entire substrate for a blanket, so that manufacturing time may be significantly reduced. In addition, the length and thickness of a substrate for a blanket do not affect gelation time, so that even if a long substrate for a blanket is used, manufacturing time may be significantly reduced to maximize process efficiency.

In addition, according to an embodiment of the present invention, since gelation is performed while rotating a reaction vessel, centrifugal force and centripetal force are applied. Therefore, compared to a roll-to-roll method in which a reaction vessel is not rotated or gelation is performed on a moving element, an aerogel blanket in which an aerogel is more uniformly dispersed may be manufactured, so that the thickness of the manufactured aerogel blanket is the same or very similar to the thickness of a substrate for a blanket, and there is an effect in that thermal insulation properties are excellent.

In addition, the manufacturing method according to an embodiment of the present invention may perform an aging step as a process for allowing a chemical change to be completely achieved by leaving the wet gel blanket composite to stand at a suitable temperature. The aging step may more firmly form the formed network structure, and thus, may enhance the mechanical stability of the aerogel blanket of the present invention.

The aging step of the present invention may be performed by leaving the wet gel blanket composite to stand at a suitable temperature, or as an another example, may be performed by adding a solution in which a base catalyst such as sodium hydroxide (NaOH), potassium hydroxide (KOH), ammonium hydroxide ($NH_4OH$), triethylamine, pyridine, or the like is diluted to a concentration of 1 to 10% in an organic solvent, in the presence of the wet gel blanket composite. In this case, a Si—O—Si bonding in an aerogel is induced to the maximum to allow the network structure of a silica gel to be more firm, so that there is an effect of facilitating the maintenance of the pore structure in a quick drying process to be performed later. At this time, the organic solvent may be the alcohol (a polar organic solvent) described above, and specifically, may include ethanol.

Also, the aging step should be performed in a suitable temperature range to enhance the optimal pore structure. The aging step of the present invention may be performed by leaving the wet gel blanket composite to stand for 1-10 hours at a temperature of 30-70° C. regardless of the introduction of a base catalyst. When the aging temperature is below 30° C., aging time becomes excessively long, which may cause the total process time to increase, so that there may be problem in that productivity decreases. When the aging temperature is above 70° C., the temperature is out of the boiling point of ethanol, so that there may be a problem in that the loss of the solvent due to evaporation increases, which may cause raw material cost to increase.

In addition, according to an embodiment of the present invention, the aging step may be performed in a separate reaction vessel after recovering a gelled silica wet gel blanket, or may be performed inside a reaction vessel in which gelation has been performed. In terms of the efficiency of a process and the simplification of equipment, the aging step may be preferably performed in the reaction vessel in which gelation has been performed. In addition, when the aging step is performed in the reaction vessel in which gelation has been performed, the wet gel blanket composite prepared in Step 3) may rotate, and when the aging is performed while the wet gel blanket composite is rotating, an aging solvent may be penetrated better, and may be dispersed better in the wet gel blanket composite after the penetration. Therefore, there is an advantage in that aging efficiency may be greatly improved.

In addition, the manufacturing method according to an embodiment of the present invention may perform a solvent substitution step before a drying step for manufacturing an aerogel blanket from a wet gel blanket composite. Wet gel of the wet gel blanket composite has pores filled with a solvent containing water and/or an organic solvent. When a step for dying the wet gel blanket composite is performed to remove the solvent, the solvent in a liquid phase vaporizes into a gaseous phase, and due to the surface tension of the solvent at a gas/liquid interface, shrinkage and cracking occurs in the structure of the pores. As a result, the specific surface area decreases and the pore structure changes in a silica aerogel finally prepared. Therefore, in order to maintain the pore structure of the wet gel, it is necessary to minimize the surface tension of the solvent, and to this end, it is necessary to have a process of substituting water having a high surface tension with a solvent having a low surface tension.

A solvent which may be mixed with a silica gel after gelation as the solvent to be substituted may be a hydrophilic polar organic solvent, and specifically, may be an alcohol. The alcohol may specifically be a monohydric alcohol such as methanol, ethanol, isopropanol, and butanol; or a polyhydric alcohol such as glycerol, ethylene glycol, propylene glycol, diethylene glycol, dipropylene glycol, and sorbitol, and any one thereof or a mixture of two or more thereof may be used. Among these, when considering the miscibility thereof with water and a hydrophobic aerogel, the alcohol may be a monohydric alcohol having 1-6 carbon atoms such as methanol, ethanol, isopropanol, and butanol.

The manufacturing method according to an embodiment of the present invention may perform a drying step for manufacturing an aerogel blanket from the wet gel blanket composite.

The drying step according to an embodiment of the present invention may be performed through a process for removing a solvent while maintaining the pore structure of an aged gel, and the drying step may be performed by a supercritical drying process or an atmospheric drying process.

The supercritical drying process may be performed using supercritical carbon dioxide. Carbon dioxide ($CO_2$) is in a gaseous state at room temperature and atmospheric pressure. However, when a temperature and pressure exceed a predetermined temperature and pressure limit called a supercritical point, the evaporation process does not occur so that carbon dioxide becomes to be in a critical state in which gas and liquid cannot be distinguished. Carbon dioxide in a critical state is referred to a supercritical carbon dioxide. A supercritical carbon dioxide has a molecular density close to that of a liquid, however, has a low viscosity, thereby having properties close to those of gas. Therefore, a supercritical carbon dioxide has a high diffusion rate and a high thermal conductivity so that drying efficiency thereof is high, and drying process time may be shortened.

Specifically, the supercritical drying process performs a solvent substitution process in which an aged wet gel blanket is placed into a supercritical drying reactor, and then $CO_2$ in a liquid state is filled therein, followed by substituting an alcohol solvent inside the wet gel with $CO_2$. Thereafter, the temperature is raised to 40-70° C. at a predetermined temperature raising rate, specifically, 0.1° C./min to 1° C./min, and the pressure which is greater than a pressure at which carbon dioxide becomes to be a supercritical state, specifically, the pressure of 100 bar to 150 bar is maintained to allow the carbon dioxide to remain in the supercritical state for a predetermined amount of time, specifically for 20 minutes to 1 hour. In general, carbon dioxide becomes to be in a supercritical state at a temperature of 31° C. and pressure of 73.8 bar. After carbon dioxide is maintained at a predetermined temperature and a predetermined pressure to remain in a supercritical state for 2 hours to 12 hours, more specifically, 2 hours to 6 hours, the pressure is generally lowered to complete the supercritical drying process to manufacture an aerogel blanket.

Also, the atmospheric drying process may be performed according to a typical method such as hot air drying and IR drying under a temperature of 70-200° C. and an atmospheric pressure (1±0.3 atm).

As a result of the above drying process, a blanket including a porous aerogel having nano-sized pores may be manufactured. Particularly, the silica aerogel according to an embodiment of the present invention has excellent physical properties, low density and high porosity in particular, together with a high degree of hydrophobicity, and a silica aerogel-containing blanket including the same has excellent mechanical flexibility together with low thermal conductivity.

In addition, before or after the drying process, a compression process to control the thickness and to make the internal structure and surface shape of a blanket uniform, a molding process to have a suitable shape or morphology according to use, or a lamination process for laminating a separate functional layer may be further performed.

The present invention provides a device for manufacturing an aerogel blanket for performing the method for manufacturing an aerogel blanket.

A device for manufacturing an aerogel blanket according to an embodiment of the present invention includes, as shown in FIG. 1, a bobbin 100 on which a blanket is to be wound, a main body 200 provided with a gelation tank 210 receiving the bobbin 100, a driving member 300 which rotates the bobbin 100 received in the gelation tank 210, a catalyzed sol supplying member 400 which injects a catalyzed sol into the gelation tank 210, an aging member (not shown) which injects an aging solution into the gelation tank 210, and a drying member (not shown) which dries the blanket by raising the temperature of the gelation tank 210.

Here, a blanket may mean a substrate for a blanket before a catalyzed sol is introduced, a substrate for a blanket into which a catalyzed sol is impregnated and/or a wet gel blanket after gelation, and may appropriately interpreted depending on the state of a substrate for a blanket in each step.

The bobbin is for winding a blanket in a roll-form, and includes a winding rod on which the blanket is wound in a roll form, and a support plate which is coupled to each end of the winding rod and supports a side portion of the blanket wound on the winding rod.

The winding rod has a cylindrical shape having a hollow penetrating in the longitudinal direction, and a blanket in a long sheet form is wound in a roll form on the outer circumferential surface thereof.

Meanwhile, the outside of the blanket wound on the winding rod may allow a catalyzed sol to be impregnated thereinto fast, and thus, stably gelled. However, there is a problem in that it takes a long time for the sol to be impregnated into the inside of the blanket. In order to prevent the above, the outer circumferential surface of the winding rod has a plurality of connection holes which are connected to the hollow.

That is, the winding rod has a hollow formed thereinside to allow a catalyzed sol injected into the gelation tank to be introduced, and has a plurality of connection holes to allow the catalyzed sol introduced into the hollow to be discharged to the outside of the winding rod, and to be impregnated into the inside of the blanket wound on the winding rod. Accordingly, the catalyzed sol is simultaneously impregnated on the outside and inside of the blanket and gelled. As a result, the time required for the gelation of the blanket may be greatly shortened, and as a result, the entire blanket may be uniformly gelled.

Meanwhile, the diameter of the plurality of connection holes is 3-5 mm, and the holes are formed at regular intervals on the outer circumferential surface of the winding rod. Accordingly, the catalyzed sol may be uniformly supplied to the entire blanket wound on the outer circumferential surface of the winding rod, and accordingly, the entire inside of the blanket may be uniformity gelled.

The support plate is to provide support such that the blanket wound on the winding rod is not irregularly wound, and has a disc shape. The support plate is coupled to each end of the winding rod and supports a side portion of the blanket wound on the winding rod.

Meanwhile, the support plate has a fastening groove to which an end of the winding rod is coupled, and has a fastening hole formed on the bottom surface of the fastening groove. That is, the support plate may be coupled to the end of the winding rod through the fastening groove.

Meanwhile, the support plate has a plurality of open holes, and the plurality of open holes may allow the catalyzed sol to be introduced into a side portion of the blanket wound on the winding rod, and accordingly, the side portion of the blanket may be stably gelled.

Therefore, the bobbin includes the winding rod and the support plate, and accordingly, may wind the blanket in a roll form.

The main body is where a gelation tank which receives a bobbin is installed, and includes the gelation tank and a first installation member 220 in which the gelation tank is installed.

The gelation tank is for gelling a blanket received in a bobbin, and includes a gelation chamber provided thereinside and receiving the bobbin, an outlet provided at an outer lower end thereof and connected to the gelation chamber, and an inlet provided at an outer upper end thereof and connected to the gelation chamber.

Particularly, the upper portion of the gelation chamber of the gelation tank is opened by a cover, and the lower portion thereof has a 'U'-shaped cross-sectional shape having curvature corresponding to a blanket wound on the winding rod. Accordingly, when a silica sol is introduced into the gelation chamber, the contact force between the silica sol and the blanket may be increased, and as a result, the gelation of the blanket may be increased.

Meanwhile, the gelation tank includes a rotation member provided on both walls of the gelation chamber and coupled to both ends of the bobbin to allow the bobbin to rotate in the gelation chamber.

The rotation member is rotatably installed in through-holes formed on both walls of the gelation chamber, and an end of the bobbin received in the gelation chamber is power transmittably installed.

As an example, on one surface of the rotation member, a coupling protrusion in a straight line shape is formed, and at the end of the bobbin, a coupling groove in a straight line shape to which the coupling protrusion is coupled is formed. That is, through the coupling of the coupling protrusion and the coupling groove, the bobbin may be rotated in the same direction when the rotation member is rotated. As a result, the bobbin may be rotatably installed inside the gelation tank.

Meanwhile, the main body further includes a second installation member 230 in which a catalyzed sol supplying member is installed. The second installation member includes a bottom piece 231, an installation stand 232 installed at an upper portion of the bottom piece and installed such that the catalyzed sol supplying member is positioned higher than the gelation tank, and a staircase 233 installed at one end of the bottom piece.

Meanwhile, the gelation tank includes a rotation handle which rotates the bobbin while being coupled to the other rotation member provided in the gelation tank, and the rotation handle may manually rotate the bobbin from the outside.

Meanwhile, on the installation stand of the second installation member, an aging member and a drying member are further installed.

The driving member is for rotating the bobbin received in the gelation tank, and is power transmittably connected to the other rotation member provided in the gelation tank. That is, when the driving member rotates the rotation member, it may rotate the bobbin received in the gelation tank by being interlocked with the rotating member.

The catalyzed sol supplying member is for gelling a blanket by injecting a silica sol into a gelation tank to impregnate the blanket wound on a bobbin, and is installed at the installation stand. The catalyzed sol supplying member supplies a catalyzed sol to a gelation chamber through an inlet of the gelation tank.

The aging member is for aging a blanket wound on a bobbin by injecting an aging solution to a gelation tank, and is installed at the installation stand. The aging member supplies an aging solution to a gelation chamber through an inlet of the gelation tank.

The drying member is for drying a blanket wound on a bobbin by supplying hot air of a high temperature to a gelation tank, and is installed at the installation stand. The drying member dries a blanket received in the gelation tank by increasing the temperature of the gelation tank.

Therefore, the device for manufacturing an aerogel blanket according to an embodiment of the present invention may greatly shorten the manufacturing time of an aerogel blanket, may greatly increase the productivity of an aerogel blanket, and as a result, may mass produce an aerogel blanket.

Particularly, the device for manufacturing an aerogel blanket according to an embodiment of the present invention may induce stable gelation regardless of the thickness and length of a blanket by rotating the blanket, and since a bobbin is rotated, the entire blanket wound on the bobbin may be uniformly gelled. Also, since only the bobbin rotates without the rotation of a gelation tank, the shape of the gelation tank is not limited. In addition, since a gelation chamber in the gelation tank is formed in a 'U'-shaped cross-sectional shape, the blanket wound on the bobbin may be more effectively gelled.

In addition, according to an embodiment of the present invention, the device for manufacturing an aerogel blanket includes a bobbin on which a blanket is wound, wherein the bobbin may include a winding rod and a support plate. Here, the outer circumferential surface of the winding rod may include a fixing clip into which a winding start point is inserted and fixed.

That is, the fixing clip has a pin shape having elastic restoring force, and one end thereof is fixed on the outer circumferential surface of the winding rod and the other end thereof is elastically supported on the outer circumferential surface of the winding rod. Accordingly, when the start point of the blanket is inserted between the other end of the fixing clip and the winding rod, the blanket may be fixed to the starting point of the winding rod by elastic force of the fixing clip, and as a result, the blanket may be simply wound on the outer circumferential surface of the winding rod.

The present invention provides an aerogel blanket manufactured by the method for manufacturing an aerogel blanket. The aerogel blanket has low thermal conductivity and a low moisture impregnation rate. At this time, the aerogel blanket is characterized by having a thermal conductivity in the blanket of 21.0 mW/mK or less. In addition, the aerogel blanket may have a moisture impregnation rate in the blanket of 2.0 wt % or less, or 1.5 wt % or less. The thermal conductivity is a feature which may appear in any aerogel blanket arbitrarily cut. Specifically, it may be a thermal conductivity value measured in an area of specifically 0.01 m2 to 10.0 $m^2$, more specifically an area of 0.36 $m^2$ to 5.0 $m^2$.

As an example, the thermal conductivity of the aerogel blanket may be obtained by obtaining a sample having a predetermined size in the aerogel blanket and measuring the room temperature (23±5° C.) thermal conductivity for each sample using the HFM 436 Lambda equipment of NETZSCH Co., Ltd.

In addition, according to an embodiment of the present invention, the aerogel blanket includes an aerogel and a substrate for a blanket, and specifically, the aerogel may be formed inside and on the surface of the substrate for a blanket. As an example, aerogel particles in a large amount may be evenly formed inside and on the surface of the substrate for a blanket.

Accordingly, the aerogel blanket of the present invention may be usefully used as a thermal insulation material, a lagging material, or a non-combustible material for aircrafts, ships, automobiles, building structures, and the like, as well as for plant facilities for insulating and cooling, such as piping and industrial furnaces of various industrial facilities.

EXAMPLES

Hereinafter, Examples of the present invention will be described in detail so that those skilled in the art may easily carry out the present invention. However, the present invention may be embodied in many different forms, and is not limited to Examples set forth herein.

Example 1

<Preparation of Catalyzed Sol>

Methyltriethoxysilane (MTES) and tetraethyl orthosilicate (TEOS) were mixed in a molar ratio of 95:5 to prepare a silica precursor composition. The silica precursor composition and water were mixed in a molar ratio of 1:10, and ethanol having a weight ratio of 1:2 with the silica precursor composition was added thereto to prepare a silica sol. In order to facilitate hydrolysis, hydrochloric acid was added to allow the pH of the silica sol to be 3 or less. Based on 100 parts by weight of the silica sol, 0.2 parts by weight of $TiO_2$, an opacifying agent, and 0.2 parts by weight of Ultracarb (LKAB Co., Ltd), a flame retardant, were mixed and then stirred for 30 minutes prepare a silica sol. 1 vol % of an ammonia ethanol solution (a base catalyst solution) was prepared separately. The silica sol and the base catalyst solution were mixed in a volume ratio of 9:1 to prepare a catalyzed sol.

<Preparation of Wet Gel Blanket>

A bobbin on which a 10 T(10 mm) glass fiber was wound was fixed to a reaction vessel. The catalyzed sol prepared above was introduced into the reaction vessel, and the bobbin on which the glass fiber was wound was rotated to perform gelation. At this time, the introduction rate of the catalyzed sol was controlled to introduce all of the catalyzed sol before the gelation was completed. When the fiber was sufficiently impregnated so that the liquid level in the reaction vessel no longer changed, a drain valve coupled to the reaction vessel was opened to recover remaining sol. 60 minutes later, the gelation was completed, and then aging was performed at a temperature of 60° C. for 20 hours. After the aging was completed, ethanol was introduced into the reaction vessel at a temperature of 60° C. to substitute the solvent.

<Drying Process>

Thereafter, a wet gel blanket was placed into a convention oven and subjected to atmospheric drying at 150° C. for 2 hours to 5 hours to completely remove the solvent and moisture, thereby manufacturing a hydrophobic silica aerogel blanket.

Example 2

A hydrophobic silica aerogel blanket was manufactured in the same manner as in Example 1, except that during the preparation of a catalyzed sol in Example 1, methyltetraethoxysilane (MTES) and tetraethyl orthosilicate (TEOS) were mixed in a molar ratio of 90:10 to prepare a silica precursor composition.

Example 3

A hydrophobic silica aerogel blanket was manufactured in the same manner as in Example 1, except that during the preparation of a catalyzed sol in Example 1, methyltetraethoxysilane (MTES) and tetraethyl orthosilicate (TEOS) were mixed in a molar ratio of 98:2 to prepare a silica precursor composition.

Example 4

A hydrophobic silica aerogel blanket was manufactured in the same manner as in Example 1 except that during the drying process in Example 1, the wet gel blanket was placed in a supercritical extractor and then $CO_2$ was injected thereto, and the temperature inside the extractor was raised to 50° C. over the course of 1 hour to perform supercritical drying at 50° C. and 100 bar, followed by performing atmospheric drying on a supercritically dried hydrophobic silica aerogel blanket in an oven at 200° C. for 2 hours to completely remove the solvent and moisture.

Example 5

A hydrophobic silica aerogel blanket was manufactured in the same manner as in Example 2 except that during the drying process in Example 2, the wet gel blanket was placed in a supercritical extractor and then $CO_2$ was injected nbereto, and the temperature inside the extractor was raised to 50° C. over the course of 1 hour to perform supercritical drying at 50° C. and 100 bar, followed by performing atmospheric drying on a supercritically dried hydrophobic silica aerogel blanket in an oven at 200° C. for 2 hours to completely remove the solvent and moisture.

Example 6

A hydrophobic silica aerogel blanket was manufactured in the same manner as in Example 3 except that during the drying process in Example 3, the wet gel blanket was placed in a supercritical extractor and then $CO_2$ was injected thereto, and the temperature inside the extractor was raised to 50° C. over the course of 1 hour to perform supercritical drying at 50° C. and 100 bar, followed by performing atmospheric drying on a supercritically dried hydrophobic silica aerogel blanket in an oven at 200° C. for 2 hours to completely remove the solvent and moisture.

Example 7

A hydrophobic silica aerogel blanket was manufactured in the same manner as in Example 1 except that in Example 1, during the preparation of a catalyzed sol, methyltriethoxysilane (MTES) and tetraethyl orthosilicate (TEOS) were mixed in a molar ratio of 95:5 to prepare a silica precursor composition, and during the drying process, the wet gel blanket was placed in a supercritical extractor and then $CO_2$ was injected thereto, and the temperature inside the extractor was raised to 50° C. over the course of 1 hour to perform supercritical drying at 50° C. and 100 bar, followed by performing atmospheric drying on a supercritically dried hydrophobic silica aerogel blanket in an oven at 200° C. for 2 hours to completely remove the solvent and moisture.

Comparative Example 1

<Preparation of Catalyzed Sol>

Tetraethyl orthosilicate (TEOS) and water were mixed in a molar ratio of 1:10 and ethanol having a weight ratio of 1:2 with TEOS was added thereto to prepare a silica sol. In order to facilitate hydrolysis, hydrochloric acid was added to allow the pH of the silica sol to be 3 or less. Based on 100 parts by weight of a silica sol, 0.2 parts by weight of $TiO_2$, an opacifying agent, and 0.2 parts by weight of Ultracarb (LKAB Co., Ltd), a flame retardant were mixed and then stirred for 30 minutes to prepare a silica sol, and 1 vol % of an ammonia ethanol solution (a base catalyst solution) was prepared separately. The silica sol and the base catalyst solution were mixed in a volume ratio of 9:1 to prepare a catalyzed sol.

<Preparation of Wet Gel Blanket>

A bobbin on which a 10 T(10 mm) glass fiber was wound was fixed to a reaction vessel. The catalyzed sol prepared above was introduced into the reaction vessel, and the bobbin on which the glass fiber was wound was rotated to perform gelation. At this time, the introduction rate of the catalyzed sol was controlled to introduce all of the catalyzed sol before the gelation was completed. When the fiber was sufficiently impregnated so that the liquid level in the reaction vessel no longer changed, a drain valve coupled to the reaction vessel was opened to recover remaining sol. 30 minutes later, when the gelation was completed, an aging solution was introduced into the reaction vessel to perform aging while rotating the bobbin. At this time, the aging solution was 5 vol % of an ammonia ethanol dilution solution, and the aging was performed at a temperature of 60° C. for 20 hours. When the aging was completed, the drain valve was opened to recover the aging solution. Thereafter, a surface modification solution was introduced into the reaction vessel to perform surface modification while rotating the bobbin, and when completed, the surface modification solution was recovered. At this time, the surface modification solution was 10 vol % of a hexamethyldisilazane (HMDS) ethanol dilution solution, and an amount thereof having the same volume ratio as the wet gel blanket composite was added. The surface modification (hydrophobization) was performed at room temperature for 8 hours.

19

<Drying Process>
Thereafter, a wet gel blanket was placed into a convention oven and subjected to atmospheric drying at 150° C. for 2 hours to 5 hours to completely remove the solvent and moisture, thereby manufacturing a hydrophobic silica aerogel blanket.

Comparative Example 2

A hydrophobic silica aerogel blanket was manufactured in the same manner as in Example 1, except that during the preparation of a catalyzed sol in Example 1, methyltetraethoxysilane (MTES) and tetraethyl orthosilicate (TEOS) were not mixed, and methyltetraethoxysilane (MTES) was used alone.

Comparative Example 3

A hydrophobic silica aerogel blanket was manufactured in the same manner as in Example 1, except that during the preparation of a catalyzed sol in Example 1, methyltetraethoxysilane (MTES) and tetraethyl orthosilicate (TEOS) were not mixed, and tetraethyl orthosilicate (TEOS) was used alone.

Comparative Example 4

A hydrophobic silica aerogel blanket was manufactured in the same manner as in Comparative Example 1 except that during the drying process in Comparative Example 1, the wet gel blanket was placed in a supercritical extractor and then $CO_2$ was injected thereto, and the temperature inside the extractor was raised to 50° C. over the course of 1 hour to perform supercritical drying at 50° C. and 100 bar, followed by performing atmospheric drying on a supercritically dried hydrophobic silica aerogel blanket in an oven at 200° C. for 2 hours to completely remove the solvent and moisture.

Comparative Example 5

A hydrophobic silica aerogel blanket was manufactured in the same manner as in Comparative Example 2 except that during the drying process in Comparative Example 2, the wet gel blanket was placed in a supercritical extractor and then $CO_2$ was injected thereto, and the temperature inside the extractor was raised to 50° C. over the course of 1 hour to perform supercritical drying at 50° C. and 100 bar, followed by performing atmospheric drying on a supercritically dried hydrophobic silica aerogel blanket in an oven at 200° C. for 2 hours to completely remove the solvent and moisture.

Comparative Example 6

A hydrophobic silica aerogel blanket was manufactured in the same manner as in Comparative Example 3 except that during the drying process in Comparative Example 3, the wet gel blanket was placed in a supercritical extractor and then $CO_2$ was injected thereto, and the temperature inside the extractor was raised to 50° C. over the course of 1 hour to perform supercritical drying at 50° C. and 100 bar, followed by performing atmospheric drying on a supercritically dried hydrophobic silica aerogel blanket in an oven at 200° C. for 2 hours to completely remove the solvent and moisture.

20

Comparative Example 7

A hydrophobic silica aerogel blanket was manufactured in the same manner as in Example 1 except that during the preparation of a wet gel blanket in Example 1, the wet gel blanket was prepared as follows.
<Preparation of Wet Gel Blanket>
Using a roll-to-roll device provided with a conveyor belt, the prepared catalyzed sol was cast and impregnated into a 10 T(10 mm) glass fiber and gelation was performed thereon. When the gelation was completed, and aging was performed at a temperature of 60° C. for 20 hours. After the aging was completed, ethanol was introduced into the reaction vessel at a temperature of 60° C. to substitute the solvent.

Comparative Example 8

A hydrophobic silica aerogel blanket was manufactured in the same manner as in Example 2 except that during the preparation of a wet gel blanket in Example 2, the wet gel blanket was prepared as follows.
<Preparation of Wet Gel Blanket>
Using a roll-to-roll device provided with a conveyor belt, the prepared catalyzed sol was cast and impregnated into a 10 T(10 mm) glass fiber and gelation was performed thereon. When the gelation was completed, and aging was performed at a temperature of 60° C. for 20 hours. After the aging was completed, ethanol was introduced into the reaction vessel at a temperature of 60° C. to substitute the solvent.

Comparative Example 9

A hydrophobic silica aerogel blanket was manufactured in the same manner as in Example 3 except that during the preparation of a wet gel blanket in Example 3, the wet gel blanket was prepared as follows.
<Preparation of Wet Gel Blanket>
Using a roll-to-roll device provided with a conveyor belt, the prepared catalyzed sol was cast and impregnated into a 10 T(10 mm) glass fiber and gelation was performed thereon. When the gelation was completed, and aging was performed at a temperature of 60° C. for 20 hours. After the aging was completed, ethanol was introduced into the reaction vessel at a temperature of 60° C. to substitute the solvent.

Experimental Examples

The thermal conductivity and moisture impregnation rate of the silica aerogel blanket manufactured in each of Examples 1 to 7 and Comparative Examples 1 and 9 were measured as follows, and the results thereof are shown in Tables 1 and 2, respectively.

Room temperature thermal conductivity (mW/mK): 5 samples each having a size of 30 cm×30 cm were prepared for each blanket in the silica aerogel blanket manufactured in each of Examples and Comparative Examples. The room temperature (23±5° C.) thermal conductivity was measured for each sample using the HFM 436 Lambda equipment of NETZSCH Co., Ltd. At this time, 5 samples were obtained by cutting at a predetermined interval of 50 cm from the innermost side to the outermost side of an aerogel blanket roll manufactured in each of Examples and Comparative Examples. The thermal conductivity of each of the 5 samples was measured, and then the measured values were compared to show the highest value and the lowest value.

Moisture impregnation rate (wt %): For the silica aerogel blanket manufactured in each of Examples and Comparative Examples, a specimen having a size of 100 mm×100 mm was floated on distilled water of 21±2° C., and a 6.4 mm mesh screen was placed on the specimen to impregnate the specimen by sinking the same to 127 mm below the surface of the water. 15 minutes later, the mesh screen was removed, and when the specimen rose to the surface, the specimen was picked up with a clamp and was hung vertically for 60±5 seconds. Thereafter, the weight before and after the impregnation were each measured to confirm a weight increase rate, and the weight increase rate was represented as a moisture impregnation rate. The lower the moisture impregnation rate, the higher the degree of hydrophobicity of the aerogel blanket.

TABLE 1

| Classification | | Examples | | | |
|---|---|---|---|---|---|
| | | 1 | 2 | 3 | 4 |
| Silica precursor composition | (Type) | MTES:TEOS | MTES:TEOS | MTES:TEOS | MTES:TEOS |
| | (Molar ratio) | 95:5 | 90:10 | 98:2 | 95:5 |
| Gelation step | | Rotation | Rotation | Rotation | Rotation |
| Surface modification step | | X | X | X | X |
| Drying step | | Atmospheric | Atmospheric | Atmospheric | Supercritical |
| Thermal conductivity highest value | (mW/mK) | 20.3 | 20.8 | 20.7 | 19.8 |
| Thermal conductivity lowest value | (mW/mK) | 19.4 | 20.1 | 19.9 | 18.5 |
| Moisture impregnation rate | (wt %) | 1.2 | 1.4 | 0.9 | 1.1 |

| Classification | | Examples | | |
|---|---|---|---|---|
| | | 5 | 6 | 7 |
| Silica precursor composition | (Type) | MTES:TEOS | MTES:TEOS | MTES:TEOS |
| | (Molar ratio) | 90:10 | 98:2 | 60:40 |
| Gelation step | | Rotation | Rotation | Rotation |
| Surface modification step | | X | X | X |
| Drying step | | Supercritical | Supercritical | Supercritical |
| Thermal conductivity highest value | (mW/mK) | 19.5 | 20.1 | 19.9 |
| Thermal conductivity lowest value | (mW/mK) | 18.3 | 18.9 | 18.4 |
| Moisture impregnation rate | (wt %) | 1.4 | 0.8 | 1.5 |

TABLE 2

| Classification | | Comparative Examples | | | | |
|---|---|---|---|---|---|---|
| | | 1 | 2 | 3 | 4 | 5 |
| Silica precursor composition | (Type) | TEOS | MTES | TEOS | TEOS | MTES |
| | (Molar ratio) | 100 | 100 | 100 | 100 | 100 |
| Gelation step | | Rotation | Rotation | Rotation | Rotation | Rotation |
| Surface modification step | | ○ | X | X | ○ | X |
| Drying step | | Atmospheric | Atmospheric | Atmospheric | Supercritical | Supercritical |
| Thermal conductivity highest value | (mW/mK) | 30.3 | 23.8 | 36.0 | 19.6 | 21.1 |
| Thermal conductivity lowest value | (mW/mK) | 28.5 | 22.5 | 34.8 | 18.0 | 20.0 |
| Moisture impregnation rate | (wt %) | 3.7 | 1.1 | X | 2.3 | 0.9 |

| Classification | | Comparative Examples | | | |
|---|---|---|---|---|---|
| | | 6 | 7 | 8 | 9 |
| Silica precursor composition | (Type) | TEOS | MTES:TEOS | MTES:TEOS | MTES:TEOS |
| | (Molar ratio) | 100 | 95:5 | 90:10 | 98:2 |
| Gelation step | | Rotation | Roll-to-roll | Roll-to-roll | Roll-to-roll |
| Surface modification step | | X | X | X | X |
| Drying step | | Supercritical | Atmospheric | Atmospheric | Atmospheric |
| Thermal conductivity highest value | (mW/mK) | 23.0 | 25.6 | 28.2 | 26.1 |

TABLE 2-continued

| | | | | | |
|---|---|---|---|---|---|
| Thermal conductivity lowest value | (mW/mK) | 22.3 | 19.5 | 20.0 | 20.2 |
| Moisture impregnation rate | (wt %) | X | 1.5 | 2.0 | 1.5 |

As shown in Table 1, Examples 1 to 7, in which a silica precursor composition including MTES, which is a silicate containing a hydrophobic group, and TEOS, which is a tetraalkyl silicate, in a specific molar ratio in the catalyzed sol was included, and gelation was performed while rotating a bobbin on which a substrate for a blanket was wound, were confirmed to have excellent thermal conductivity and an excellent moisture impregnation rate, regardless of drying conditions.

In addition, Examples 1 to 7 exhibited a very small deviation of 1.5 mW/mK or less between the highest value and lowest value of the thermal conductivity from the innermost side to the outermost side of the aerogel blanket roll, so that it was confirmed that an aerogel was uniformly formed in the blanket substrate.

Particularly, it was confirmed that Examples 1 to 3, in which atmospheric drying was performed when the wet gel blanket was dried to manufacture the aerogel blanket, exhibited the same level of thermal conductivity and moisture impregnation rate as Examples 4 to 7 in which supercritical drying was performed.

However, as shown in Table 2 above, it was confirmed that in the case of Comparative Examples 1, 3, 4, and 6 in which only TEOS was used as a silica precursor in the catalyzed sol, Comparative Example 4 in which a surface modification step was additionally performed showed a similar level of thermal conductivity as Examples through supercritical drying, but had an increased moisture impregnation rate. In addition, it was confirmed that Comparative Example 1 in which atmospheric drying was performed with only different drying conditions from Comparative Example 4 had poor thermal conductivity and an increased moisture impregnation rate. This may be due to the fact that even when a surface modification step was additionally performed, a sufficient amount of surface modifier was not introduced into the aerogel, so that the adsorption of moisture occurred by the hydrogen bonding between a hydroxyl group present on the surface of the inside of the aerogel and moisture in the solvent. In addition, Comparative Examples 3 and 6 in which a surface modification step was not additionally performed had poor thermal conductivity regardless of drying conditions, and the silica aerogel blanket itself was hydrophilic, so that moisture was impregnated thereinto in a very excessive amount, which made it impossible to measure a moisture impregnation rate. Particularly, Comparative Example 3 in which atmospheric drying was performed without additionally performing a surface modification step had extremely poor thermal conductivity.

In addition, Comparative Examples 2 and 5 which used only MTES, a silicate containing a hydrophobic group, as a silica precursor in the catalyzed sol respectively had degraded thermal conductivity compared to Examples 1 to 3 and Examples 4 to 7 which performed the same drying step.

In addition, Comparative Examples 7 to 9 which included a silica precursor composition including MTES, a silicate containing a hydrophobic group, and TEOS, a tetraalkyl silicate, in a specific molar ratio in a catalyzed sol, but performed a gelation step by a roll-to-roll technique instead of performing gelation while rotating a bobbin on which a substrate for a blanket is wound, had poor thermal conductivity and a degraded moisture impregnation rate compared to Examples 1 to 3 which performed the same drying step, and had a very large deviation of 5.0 mW/mK or greater between the highest value and lowest value of the thermal conductivity, so that it can be confirmed that an aerogel was not uniformly formed in the blanket substrate. This may be due to the evaporation of the solvent during gelation. In addition, in the case of Comparative Examples 7 to 9, gelation time was increased due to MTES, a silicate containing a hydrophobic group, and accordingly, there was a problem in that a device for performing the roll-to-roll technique became enormous in size. Specifically, in the case of Comparative Examples 7 to 9, when the roll-to-roll technique is used, a conveyor belt must be included in the equipment to cast a catalyzed sol and the like on a substrate and to ensure complete gelation, and the conveyor belt must be extended until the gelation is completed, so that there is a problem in that the equipment scale becomes massive in a mass production stage. In addition, there is a problem in that as an aerogel blanket to be manufactured becomes longer, so does a conveyor belt, and therefore, gelation time is increased, thereby increasing an overall manufacturing time. In particular, when an aerogel blanket becomes thinner, the length thereof is increased, thereby increasing manufacturing time, so that there is a problem in that the manufacturing time is affected by the thickness and length of the blanket.

From above the experimental results, it can be confirmed that when a silica precursor composition including a silicate containing a hydrophobic group and a tetraalkyl silicate in a specific molar ratio is used as a silica precursor in the manufacturing of an aerogel blanket, it is possible to omit a surface modification step which uses a large amount of an organic solvent and an expensive surface modifier, and the process of which is complex and long, thereby inhibiting economic feasibility and productivity, and that even when atmospheric drying is performed, the physical properties were at the same level as when supercritical drying is performed.

In addition, it was confirmed that when gelation was performed while rotating a substrate for a blanket into which a catalyzed sol was impregnated during a gelation process of an aerogel blanket, an aerogel was uniformly formed in the blanket, so that excellent thermal conductivity was achieved. Also, the physical properties of the aerogel blanket did not greatly vary by position therein, so that quality was improved.

The foregoing description of the present invention has been presented for purposes of illustration. It will be understood by those skilled in the art that various changes in form and details may be made therein without departing from the spirit and scope of the invention. It is therefore to be understood that the above-described embodiments are illustrative in all aspects and not restrictive.

The invention claimed is:

1. A method for manufacturing an aerogel blanket, the method comprising:
    introducing a catalyzed sol and a substrate into a reaction vessel, and rotating the substrate to impregnate the catalyzed sol into the substrate; and
    rotating the substrate for gelation in the reaction vessel,
    wherein the catalyzed sol includes a silica precursor composition,
    the silica precursor composition includes a silicate containing a hydrophobic group and a tetraalkyl silicate, wherein a molar ratio of the silicate containing a hydrophobic group and the tetraalkyl silicate is 60:40 to 98:2, and
    while rotating the substrate, centrifugal force and centripetal force are applied.

2. The method of claim 1, wherein the molar ratio of the silicate containing a hydrophobic group and the tetraalkyl silicate is 85:15 to 98:2.

3. The method of claim 1, wherein the silicate containing a hydrophobic group is one or more selected from the group consisting of methyltriethoxysilane (MTES), trimethylethoxysilane (TMES), trimethylsilanol (TMS), methyltrimethoxysilane (MTMS), dimethyldiethoxysilane (DMDEOS), ethyltriethoxysilane (ETES), and phenyltriethoxysilane (PTES).

4. The method of claim 1, wherein the substrate is introduced into the reaction vessel in the state of being wound on a bobbin, and the bobbin is rotated to rotate the substrate into which the catalyzed sol is impregnated.

5. The method of claim 4, wherein the bobbin includes a winding rod having a cylindrical shape with a hollow penetrating in the longitudinal direction, and the substrate, and the substrate is wound in a roll form on an outer circumferential surface of the winding rod.

6. The method of claim 5, wherein the winding rod include a plurality of connection holes.

7. The method of claim 6, wherein the plurality of connection holes are placed at regular intervals on the outer circumferential surface of the winding rod.

8. The method of claim 6, wherein the plurality of connection holes have a diameter of 3 to 5 mm.

9. The method of claim 1, wherein the introducing of a catalyzed sol and a substrate is performed by:
    introducing the substrate into the reaction vessel and then introducing a catalyzed sol;
    introducing the catalyzed sol into the reaction vessel and then introducing the substrate; or
    introducing the substrate while introducing the catalyzed sol into the reaction vessel.

10. The method of claim 1, wherein the rotating the substrate is performed before completion of the introducing a catalyzed sol and a substrate into a reaction vessel, and when the rotating the substrate is performed before the completion of the introducing a catalyzed sol and a substrate into a reaction vessel, all of the catalyzed sol is introduced into the reaction vessel before the gelation is completed.

11. The method of claim 1, wherein the substrate into which the catalyzed sol is impregnated is rotated at a rate of 1 rpm to 300 rpm.

12. The method of claim 1, wherein the catalyzed sol is a catalyzed silica sol.

13. The method of claim 1, wherein the catalyzed sol comprises a silica sol and a base catalyst, and the silica sol contains a silica precursor composition, water, and an organic solvent.

14. The method of claim 13, wherein the silica sol further comprises an acid catalyst.

15. The method of claim 13, wherein the base catalyst includes sodium hydroxide (NaOH), potassium hydroxide (KOH), ammonium hydroxide ($NH_4OH$), triethylamine, pyridine, or a mixture thereof.

16. The method of claim 13, wherein the acid catalyst comprises hydrochloric acid, nitric acid, or sulfuric acid.

17. The method of claim 1, further comprising drying after the rotating the substrate, wherein the drying is performed by supercritical drying or by an atmospheric drying process performed at a pressure of 1±0.3 atm and a temperature of 70° C. to 200° C.

18. The method of claim 1, further comprising aging the aerogel blanket after the drying, by leaving the wet gel blanket composite to stand for 1 to 10 hours at a temperature of 30 to 70° C.

19. The method of claim 1, wherein the molar ratio of the silicate containing a hydrophobic group and the tetraalkyl silicate is 60:40 to 95:5.

20. The method of claim 1, wherein the molar ratio of the silicate containing a hydrophobic group and the tetraalkyl silicate is 60:40 to 90:10.

* * * * *